United States Patent
Vuong et al.

(10) Patent No.: US 10,986,198 B2
(45) Date of Patent: *Apr. 20, 2021

(54) MULTICOMPUTER PROCESSING OF USER DATA WITH CENTRALIZED EVENT CONTROL

(71) Applicant: Bank of America Corporation, Charlotte, NC (US)

(72) Inventors: Minh Vuong, Clovis, CA (US); Cameron Wadley, Waxhaw, NC (US); Susan Varghese, Atlanta, GA (US); Anna Hollifield, Charlotte, NC (US); Mohamed A. Gahnoog, Charlotte, NC (US); Katherine Dintenfass, Lincoln, RI (US); William August Stahlhut, The Colony, TX (US)

(73) Assignee: Bank of America Corporation, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/599,337

(22) Filed: Oct. 11, 2019

(65) Prior Publication Data
US 2020/0045121 A1 Feb. 6, 2020

Related U.S. Application Data

(63) Continuation of application No. 15/725,553, filed on Oct. 5, 2017, now Pat. No. 10,484,490.

(51) Int. Cl.
*H04L 12/00* (2006.01)
*H04L 29/08* (2006.01)
(Continued)

(52) U.S. Cl.
CPC ............. *H04L 67/22* (2013.01); *G06N 20/00* (2019.01); *G06Q 20/08* (2013.01); *G06Q 20/108* (2013.01);
(Continued)

(58) Field of Classification Search
CPC .. G06Q 20/108; G06Q 20/08; G06Q 2240/00; G06Q 50/01; G06Q 20/384;
(Continued)

(56) References Cited

U.S. PATENT DOCUMENTS

5,390,316 A 2/1995 Cramer et al.
5,517,656 A 5/1996 Shi
(Continued)

*Primary Examiner* — Frantz Coby
(74) *Attorney, Agent, or Firm* — Banner & Witcoff, Ltd.; Michael A. Springs (57) ABSTRACT

Aspects of the disclosure relate to multicomputer processing of data from social media service computing platforms and other sources with centralized event control. An event control computing platform may receive information from one or more social media service computing platforms. Subsequently, the event control computing platform may identify, based on the received information, whether a change should be made to user data associated with a user identifiable by the received information. If the information indicates that a change should be made to the user data, then the event control computing platform may extract metadata from the received information to verify the accuracy of the received information. When the metadata verifies the accuracy of the received information, the event control computing platform may generate a command configured to cause a change to the user data and then may transmit the generated command to an event validation computing platform.

20 Claims, 8 Drawing Sheets

(51) Int. Cl.
   *G06Q 50/00* (2012.01)
   *G06Q 20/10* (2012.01)
   *G06N 20/00* (2019.01)
   *G06Q 20/08* (2012.01)

(52) U.S. Cl.
   CPC ............. *G06Q 50/01* (2013.01); *H04L 67/16* (2013.01); *H04L 67/18* (2013.01); *G06Q 2240/00* (2013.01)

(58) Field of Classification Search
   CPC ......... H04L 67/22; H04L 67/16; H04L 67/18; G06N 20/00
   USPC .......................................... 709/204; 707/710
   See application file for complete search history.

(56) References Cited

U.S. PATENT DOCUMENTS

| | | | |
|---|---|---|---|
| 6,978,194 B2* | 12/2005 | McIlhany | G05B 15/02 700/276 |
| 7,080,143 B2 | 7/2006 | Hunt et al. | |
| 7,143,064 B2 | 11/2006 | Picciallo et al. | |
| 7,242,991 B2* | 7/2007 | Budinger | G05B 19/41865 700/95 |
| 7,395,131 B2* | 7/2008 | Funk | G05B 15/02 700/108 |
| 7,653,595 B2 | 1/2010 | Picciallo et al. | |
| 7,814,198 B2 | 10/2010 | Christensen et al. | |
| 7,912,783 B2 | 3/2011 | Chiulli et al. | |
| 8,127,982 B1 | 3/2012 | Casey et al. | |
| 8,145,573 B2 | 3/2012 | Hill | |
| 8,290,866 B1 | 10/2012 | Little | |
| 8,459,544 B2 | 6/2013 | Casey et al. | |
| 8,571,986 B2 | 10/2013 | Dooley Maley et al. | |
| 8,583,554 B2 | 11/2013 | Dooley Maley et al. | |
| 8,615,313 B2* | 12/2013 | Wilson | G06F 9/542 700/11 |
| 8,635,117 B1 | 1/2014 | Acuna-Rohter | |
| 9,075,868 B2 | 7/2015 | Mehanna et al. | |
| 9,104,667 B2* | 8/2015 | Codella | G06F 16/00 |
| 9,110,953 B2* | 8/2015 | Steinberg | G06F 16/00 |
| 9,165,423 B2* | 10/2015 | Barclay | G07F 17/3225 |
| 9,264,463 B2* | 2/2016 | Rubinstein | H04L 65/403 |
| 9,418,365 B2 | 8/2016 | Groarke et al. | |
| 9,477,984 B2 | 10/2016 | Bennett et al. | |
| 9,483,765 B2 | 11/2016 | Sahadevan et al. | |
| 9,497,199 B2* | 11/2016 | Das | G06F 16/21 |
| 9,514,483 B2 | 12/2016 | Chomsky et al. | |
| 9,514,484 B2 | 12/2016 | Chomsky et al. | |
| 9,519,932 B2 | 12/2016 | Calman et al. | |
| 9,524,524 B2 | 12/2016 | Calman et al. | |
| 9,576,294 B2 | 2/2017 | Gebb et al. | |
| 9,607,344 B2 | 3/2017 | Athale et al. | |
| 9,633,398 B2 | 4/2017 | Jesudian | |
| 9,672,082 B2* | 6/2017 | Thukkaram | G06F 16/24568 |
| 9,684,905 B1 | 6/2017 | Haller et al. | |
| 9,715,700 B2 | 7/2017 | Chomsky et al. | |
| 9,767,467 B2 | 9/2017 | Gebb et al. | |
| 9,779,404 B2 | 10/2017 | Spencer, II | |
| 2008/0235234 A1* | 9/2008 | Beedubail | G06F 16/23 |
| 2011/0022602 A1* | 1/2011 | Luo | G06F 16/24578 707/748 |
| 2011/0179029 A1 | 7/2011 | Kim et al. | |
| 2013/0282282 A1* | 10/2013 | Jiang | G01C 21/3679 701/533 |
| 2013/0282566 A1 | 10/2013 | Davis et al. | |
| 2014/0006377 A1 | 1/2014 | Astore | |
| 2014/0074712 A1* | 3/2014 | Palmer | G06Q 30/06 705/44 |
| 2014/0180566 A1* | 6/2014 | Malhotra | G08G 3/02 701/300 |
| 2014/0237487 A1* | 8/2014 | Prasanna | G06Q 10/10 719/318 |
| 2015/0026721 A1* | 1/2015 | Feng | H04L 51/32 725/35 |
| 2015/0066892 A1 | 3/2015 | Astore | |
| 2015/0143532 A1* | 5/2015 | Toffa | G06Q 20/384 726/26 |
| 2015/0227840 A1* | 8/2015 | Codella | G06K 9/6267 706/12 |
| 2016/0050281 A1 | 2/2016 | Jain et al. | |
| 2016/0335675 A1 | 11/2016 | Kshirsagar et al. | |
| 2016/0335679 A1 | 11/2016 | Kshirsagar et al. | |
| 2016/0350760 A1 | 12/2016 | Groarke et al. | |
| 2016/0350846 A1 | 12/2016 | Dintenfass et al. | |
| 2017/0004495 A1 | 1/2017 | Snyder et al. | |
| 2017/0011419 A1 | 1/2017 | Cai et al. | |
| 2017/0024738 A1 | 1/2017 | Vaidyanathan | |
| 2017/0039608 A1 | 2/2017 | Sandre et al. | |
| 2017/0039645 A1 | 2/2017 | Sandre et al. | |
| 2017/0046710 A1 | 2/2017 | Sahadevan et al. | |
| 2017/0046750 A1 | 2/2017 | Chomsky et al. | |
| 2017/0053319 A1 | 2/2017 | Lynn | |
| 2017/0083953 A1 | 3/2017 | Arora | |
| 2017/0132592 A1 | 5/2017 | Athale et al. | |
| 2017/0161777 A1 | 6/2017 | Shuken et al. | |
| 2017/0186021 A1 | 6/2017 | Lee et al. | |
| 2017/0193505 A1 | 7/2017 | Erhart et al. | |
| 2017/0193597 A1 | 7/2017 | Cai et al. | |
| 2017/0228712 A1 | 8/2017 | Jesudian | |
| 2017/0331866 A1 | 11/2017 | Corbin et al. | |
| 2017/0353426 A1 | 12/2017 | Nagao | |
| 2018/0020070 A1 | 1/2018 | Jazayeri | |

* cited by examiner

Event Control Platform
*Request Authorization*

Event Date: XX-YY-ZZZZ

Event Type: Increase Funds Available To <Name>

Event Amount: $NNN  Modify

Event Occurrence: Single

Reason For Event:  <Insert Reason For Fund Increase>

Approve   Reject

Event Control Platform
*Warning: Product Recall*

Product Name: <Enter Name of Product>

Product Description: <Enter Description of Product>

Details: WARNING:  The above-described product is currently under a product recall.  Please do not purchase the above-described product.

MULTICOMPUTER PROCESSING OF USER DATA WITH CENTRALIZED EVENT CONTROL

CROSS REFERENCE TO RELATED APPLICATIONS

This application is a continuation of and claims priority to U.S. application Ser. No. 15/725,553, filed Oct. 5, 2017, and entitled "Multicomputer Processing of User Data with Centralized Event Control," which is incorporated herein by reference in its entirety.

BACKGROUND

Aspects of the disclosure relate to electrical computers, digital processing systems, and multicomputer data processing. In particular, one or more aspects of the disclosure relate to enabling multicomputer processing of data from social media service computing platforms with centralized event control.

As computer systems are increasingly utilized to provide automated and electronic services, such computer systems may obtain and maintain increasing amounts of various types of sensitive information, and ensuring the safety, security, and accuracy of this information may be increasingly important. In many instances, however, it may be difficult to ensure the safety and security of such information while also optimizing the efficient and effective technical operations of the computer systems that process such information and/or provide such automated and electronic services.

SUMMARY

Aspects of the disclosure provide effective, efficient, scalable, and convenient technical solutions that address and overcome the technical problems associated with providing information security and optimizing the efficient and effective technical operations of computer systems. In particular, one or more aspects of the disclosure provide techniques for processing user data using multicomputer data processing technology and centralized event control to improve information security and enhance technical performance.

In accordance with one or more embodiments, an event control computing platform having at least one processor, a memory, and a communication interface may establish, via the communication interface, a plurality of connections to a plurality of social media service computing platforms. While the plurality of connections is established, the event control computing platform may receive first information from at least one of the plurality of social media service computing platforms. Subsequently, the event control computing platform may identify, based on the first information, whether a change should be made to user data associated with a first subordinate user identifiable by the first information. Then the event control computing platform may determine that the first information indicates that a change should be made to the user data. Next, the event control computing platform may extract metadata from the first information to verify accuracy of at least one aspect of the first information. Subsequently, the event control computing platform may determine that the metadata verifies the accuracy of the at least one aspect of the first information. Next, the event control computing platform may generate a command configured to cause the change to the user data. Finally, the event control computing platform may transmit, via the communication interface, the command to an event validation computing platform.

In some embodiments, the event control computing platform may transmit, via the communication interface, to a first subordinate user computing device associated with the first subordinate user, a first notification of the change to the user data. In other embodiments, the event control computing platform may transmit, prior to sending the command configured to cause the change to the user data, to a supervisory user computing device associated with a supervisory user, a request for authorizing the change to the user data. In further aspects, the event control computing platform may transmit, via the communication interface, to the supervisory user computing device associated with the supervisory user, a second notification of the change to the user data.

Further still, the event control computing platform may reprogram functionality of the event control computing platform, using a machine learning engine, to alter a condition under which the user data is changed. In some embodiments, the event control computing platform may reprogram functionality of the event control computing platform, using the machine learning engine, such that the condition under which the user data is changed is based on a distance that the first subordinate user is located away from a residence of the first subordinate user. In other embodiments, the event control computing platform may reprogram functionality of the event control computing platform, using the machine learning engine, such that the condition under which the user data is changed is based on a number of other individuals with which the first subordinate user is travelling. In other embodiments, the event control computing platform may reprogram functionality of the event control computing platform, using the machine learning engine, such that the condition under which the user data is changed is based on additional information received from the plurality of social media service computing platforms. The additional information may relate to a plurality of other subordinate users identifiable by the additional information. In other embodiments, the event control computing platform may reprogram functionality of the event control computing platform, using the machine learning engine, such that the condition under which the user data is changed is based on the additional information received about the plurality of other subordinate users that are similar to the first subordinate user.

In some embodiments, determining that the metadata verifies the accuracy of the at least one aspect of the first information may comprise determining that the metadata verifies the accuracy of a location of the first subordinate user. In other aspects, the event control computing platform may determine that a warning message should be transmitted to the first subordinate user regarding a future event.

In some aspects, the event control computing platform may determine if a threshold associated with the user data will be exceeded and may transmit, via the communication interface, the command configured to cause the change to the user data to the event validation computing platform if the threshold will be exceeded.

In some aspects, receiving the first information from the at least one of the plurality of social media service computing platforms comprises receiving the first information from the at least one of the plurality of social media service computing platforms in real time.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Aspects of the disclosure relate to changing user data in response to information received from one or more social media service computing platforms. In some embodiments, the information from the social media service computing platforms may first be validated before action is taken to change the user data.

Figure 1A:
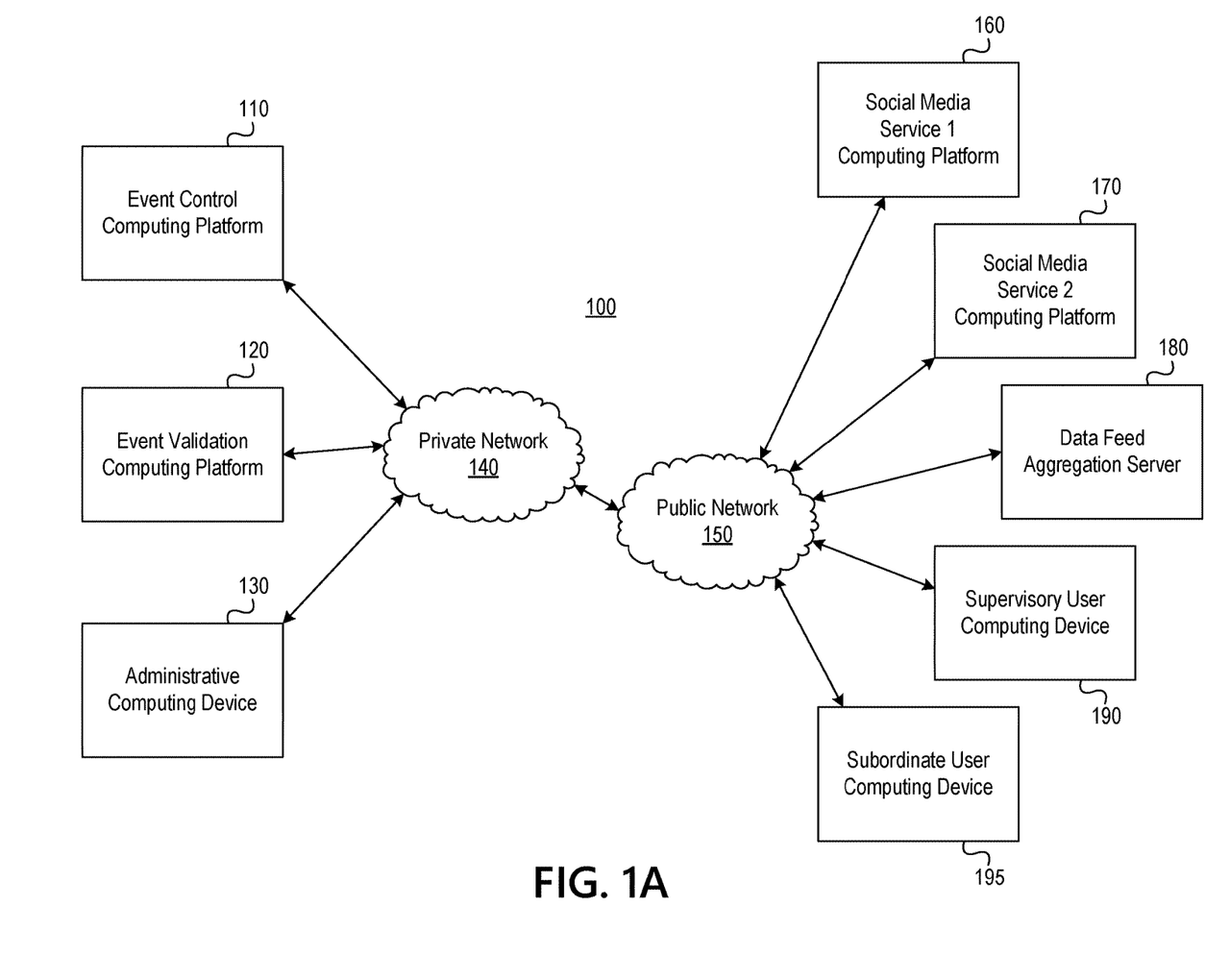
FIGS. 1A and 1B depict an illustrative computing environment for validating and controlling events executed across multiple computing platforms and devices in accordance with one or more example embodiments.
Figure 1B:
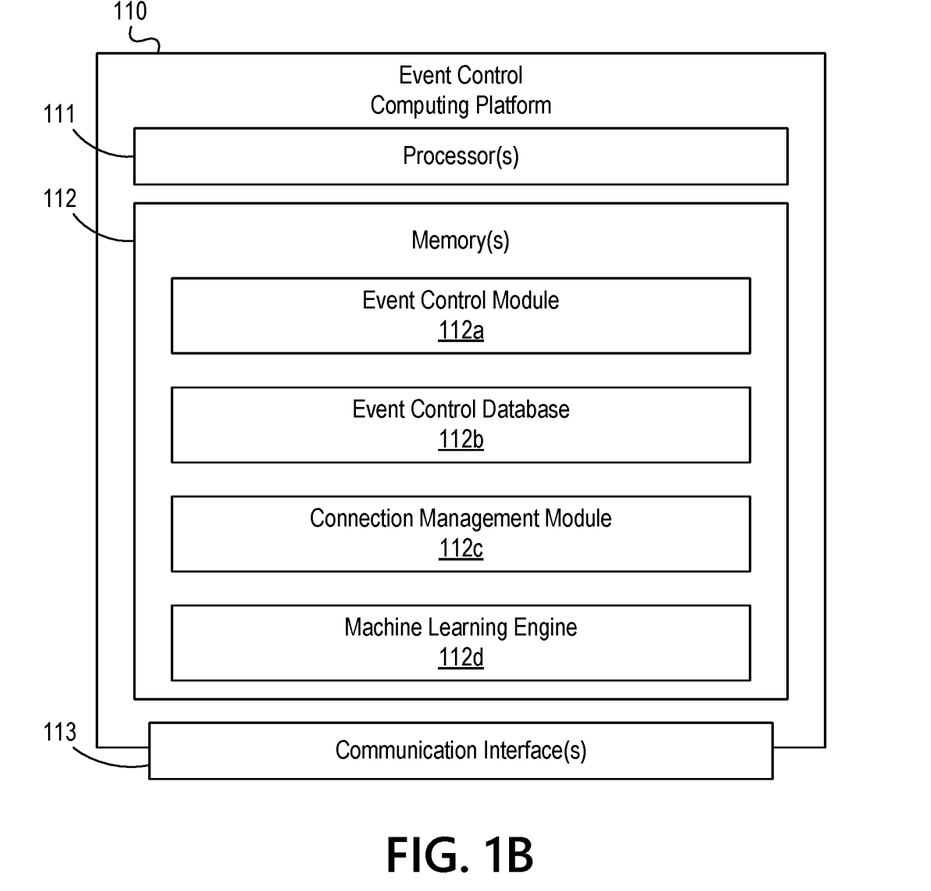

FIGS. 1A and 1B depict an illustrative computing environment for validating and controlling events executed across multiple computing platforms and devices in accordance with one or more example embodiments. Referring to FIG. 1A, computing environment 100 may include one or more computer systems, one or more computer networks, and/or other computing infrastructure. For example, computing environment 100 may include an event control computing platform 110, an event validation computing platform 120, an administrative computing device 130, a private network 140, a public network 150, a first social media service computing platform 160, a second social media service computing platform 170, a data feed aggregation server 180, a supervisory user computing device 190, and a subordinate user computing device 195.

As discussed in greater detail below, event control computing platform 110 may include one or more computing devices configured to perform one or more of the functions described herein. For example, event control computing platform 110 may include one or more computers (e.g., laptop computers, desktop computers, servers, server blades, or the like) that are configured to orchestrate event validation operations and event control operations across multiple computer systems and devices in computing environment 100.

Event validation computing platform 120 may include one or more computing devices configured to validate events based on event data received from event control computing platform 110 and/or from other sources. For example, event validation computing platform 120 may receive, from event control computing platform 110 and/or one or more other systems, event information defining one or more events to be executed in computing environment 100, and event validation computing platform 120 subsequently may authorize and/or otherwise validate the one or more events to be executed in computing environment 100, so as to allow the events to proceed and/or otherwise be executed. In some instances, the one or more events may correspond to one or more financial transactions that have been requested by one or more computing devices, such as supervisory user computing device 190 and/or subordinate user computing device 195, and event validation computing platform 120 may evaluate and/or selectively authorize the requested transactions based on information stored and/or maintained by event validation computing platform 120 (e.g., such as financial account information, account balance information, transaction history information, and/or account rules) and/or based on information received from event control computing platform 110 (e.g., such as user-specific transaction rules, account-specific transaction rules, user-specific trends information, user-segment trends information, and/or other information) and/or one or more other systems.

Administrative computing device 130 may be a desktop computer, laptop computer, workstation, or other computing device that is configured to be used by an administrative user, such as a network administrator associated with an organization operating event control computing platform 110 and/or event validation computing platform 120.

Social media service computing platform 160 may include one or more computing devices configured to host a first social media service (which may, e.g., be provided by an organization different from the organization operating event control computing platform 110 and/or event validation computing platform 120). In some instances, social media service computing platform 160 may maintain user profile information for various users of the first social media service, provide user interfaces associated with the first social media service to various user devices (e.g., supervisory user computing device 190, subordinate user computing device 195), and provide activity feed data to other systems and/or devices included in computing environment 100, such as event control computing platform 110, event validation computing platform 120, data feed aggregation server 180, and/or the like. For instance, social media service computing platform 160 may, in some arrangements, provide activity feed data (e.g., such as user-specific image data, user-specific geolocation data, user-specific likes data, and/or other user-specific data) to event control computing platform 110 to enable one or more functions provided by event control computing platform 110 (e.g., such as social-media-enabled financial-transaction functions).

Social media service computing platform 170 may include one or more computing devices configured to host a second social media service (which may, e.g., be provided by an organization different from the organization operating event control computing platform 110 and/or event validation computing platform 120). Additionally, the second social media service may be different from the first social media service (e.g., the second social media service may be provided by an organization different from the organization providing the first social media service). In some instances, social media service computing platform 170 may maintain user profile information for various users of the second social media service, provide user interfaces associated with the second social media service to various user devices (e.g., supervisory user computing device 190, subordinate user computing device 195), and provide activity feed data to other systems and/or devices included in computing environment 100, such as event control computing platform 110, event validation computing platform 120, data feed aggregation server 180, and/or the like. For instance, social media service computing platform 170 may, in some arrangements, provide activity feed data (e.g., such as user-specific image data, user-specific geolocation data, user-specific likes data, and/or other user-specific data) to event control computing platform 110 to enable one or more functions provided by event control computing platform 110 (e.g., such as social-media-enabled financial-transaction functions).

Data feed aggregation server 180 may include one or more computing devices configured to aggregate data feeds from various source systems (e.g., social media service computing platform 160, social media service computing platform 170, and/or other sources) and/or communicate data feeds to various destination systems (e.g., event control computing platform 110). In some instances, data feed aggregation server 180 may receive social media activity feed data from various social media platforms (e.g., social media service computing platform 160, social media service computing platform 170), merchant offer data from various merchant platforms (e.g., defining one or more merchant-specific offers that may be redeemable by customers at such merchants), and/or other activity data and/or content from other sources, and data feed aggregation server 180 may aggregate any and/or all of the received data to produce an aggregated data feed. Subsequently, data feed aggregation server 180 may communicate and/or otherwise provide the aggregated data feed to one or more destination systems, such as event control computing platform 110, so as to enable one or more functions provided by event control computing platform 110 (e.g., such as social-media-enabled financial-transaction functions). In some instances, the aggregated data feed may be communicated by data feed aggregation server 180 to event control computing platform 110 via a secure and/or encrypted communications link established between event control computing platform 110 and data feed aggregation server 180. In other instances, data feeds may be separately communicated from each of platforms 160, 170 to platform 110 via multiple secure and/or encrypted communications links established between platforms 160, 170 and platform 110.

Supervisory user computing device 190 may be a desktop computer, laptop computer, workstation, or other computing device that is configured to be used by a supervisory user. Subordinate user computing device 195 may be a desktop computer, laptop computer, workstation, or other computing device that is configured to be used by a subordinate user. In some arrangements, the supervisory user may be a parent and the subordinate user may be a teen or other minor supervised by the parent. For instance, the user of supervisory user computing device 190 may utilize supervisory user computing device 190 to define one or more rules (e.g., such as spending limits, transaction approval conditions, and/or the like) for the user of subordinate user computing device 195. In addition, as the user of subordinate user computing device 195 utilizes subordinate user computing device 195 and/or one or more other systems and/or devices to request transactions, event control computing platform 110 and/or event validation computing platform 120 may selectively authorize such transactions based on rules received from supervisory user computing device 190 and/or defined by the user of supervisory user computing device 190 and/or based on other factors and/or rules.

Computing environment 100 also may include one or more networks, which may interconnect one or more of event control computing platform 110, event validation computing platform 120, administrative computing device 130, social media service computing platform 160, social media service computing platform 170, data feed aggregation server 180, supervisory user computing device 190, and subordinate user computing device 195. For example, computing environment 100 may include private network 140, which may be owned and/or operated by a specific organization and/or which may interconnect one or more systems and/or other devices associated with the specific organization. For example, event control computing platform 110, event validation computing platform 120, and administrative computing device 130 may be owned and/or operated by a specific organization, such as a financial institution, and private network 140 may interconnect event control computing platform 110, event validation computing platform 120, administrative computing device 130, and one or more other systems and/or devices associated with the organization. Additionally, private network 140 may connect (e.g., via one or more firewalls) to one or more external networks not associated with the organization, such as public network 150. Public network 150 may, for instance, include the internet and may connect various systems and/or devices not associated with the organization operating private network 140. For example, public network 150 may interconnect social media service computing platform 160, social media service computing platform 170, data feed aggregation server 180, supervisory user computing device 190, subordinate user computing device 195, and/or various other systems and/or devices.

In some arrangements, the computing devices that make up and/or are included in event control computing platform 110, event validation computing platform 120, administrative computing device 130, social media service computing platform 160, social media service computing platform 170, data feed aggregation server 180, supervisory user computing device 190, and subordinate user computing device 195 may be any type of computing device capable of receiving a user interface, receiving input via the user interface, and communicating the received input to one or more other computing devices. For example, the computing devices that make up and/or are included in event control computing platform 110, event validation computing platform 120, administrative computing device 130, social media service computing platform 160, social media service computing platform 170, data feed aggregation server 180, supervisory user computing device 190, and subordinate user computing device 195 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of the computing devices that make up and/or are included in event control computing platform 110, event validation computing platform 120, administrative computing device 130, social media service computing platform 160, social media service computing platform 170, data feed aggregation server 180, supervisory user computing device 190, and subordinate user computing device 195) may, in some instances, be special-purpose computing devices configured to perform specific functions.

Referring to FIG. 1B, event control computing platform 110 may include one or more processor(s) 111, memory(s) 112, and communication interface(s) 113. A data bus may interconnect processor(s) 111, memory(s) 112, and communication interface(s) 113. Communication interface(s) 113 may be one or more network interfaces configured to support communications between event control computing platform 110 and one or more networks (e.g., private network 140, public network 150). For example, event control computing platform 110 may establish one or more connections and/or communication links to one or more other systems and/or devices (e.g., event validation computing platform 120, administrative computing device 130, social media service computing platform 160, social media service computing platform 170, data feed aggregation server 180, supervisory user computing device 190, and subordinate user computing device 195) via communication interface(s) 113, and event control computing platform 110 may exchange data with the one or more other systems and/or devices (e.g., event validation computing platform 120, administrative computing device 130, social media service computing platform 160, social media service computing platform 170, data feed aggregation server 180, supervisory user computing device 190, and subordinate user computing device 195) via communication interface(s) 113 while the one or more connections and/or communication links are established. Memory(s) 112 may include one or more program modules having instructions that when executed by processor(s) 111 cause event control computing platform 110 to perform one or more functions described herein and/or one or more databases that may store and/or otherwise maintain information which may be used by such program modules and/or processor(s) 111. In some instances, the one or more program modules and/or databases may be stored by and/or maintained in different memory units of event control computing platform 110 and/or by different computing devices that may form and/or otherwise make up event control computing platform 110.

For example, memory(s) 112b may have, store, and/or include an event control module 112a, an event control database 112b, a connection management module 112c, and a machine learning engine 112d. Event control module 112a may have, store, and/or include instructions that direct and/or cause event control computing platform 110 to orchestrate event validation operations and event control operations across multiple computer systems and devices in computing environment 100 and perform other associated functions, as discussed in greater detail below. Event control database 112b may store information used by event control computing platform 110 in orchestrating event validation operations and event control operations across multiple computer systems and devices in computing environment 100 and in performing other associated functions. Connection management module 112c may have, store, and/or include instructions that direct and/or cause event control computing platform 110 to establish one or more connections and/or communication links to one or more other systems and/or devices (e.g., event validation computing platform 120, administrative computing device 130, social media service computing platform 160, social media service computing platform 170, data feed aggregation server 180, supervisory user computing device 190, and subordinate user computing device 195) via communication interface(s) 113 and/or to manage and/or otherwise control the exchanging of data with the one or more other systems and/or devices (e.g., event validation computing platform 120, administrative computing device 130, social media service computing platform 160, social media service computing platform 170, data feed aggregation server 180, supervisory user computing device 190, and subordinate user computing device 195) via communication interface(s) 113 while the one or more connections and/or communication links are established. Machine learning engine 112d may have, store, and/or include instructions that direct and/or cause event control computing platform 110 to dynamically analyze data collected by event control computing platform 110 based on historical data sets and/or present operations and automatically optimize the functions provided by event control computing platform 110 based on analyzing such data.

Figure 2A:
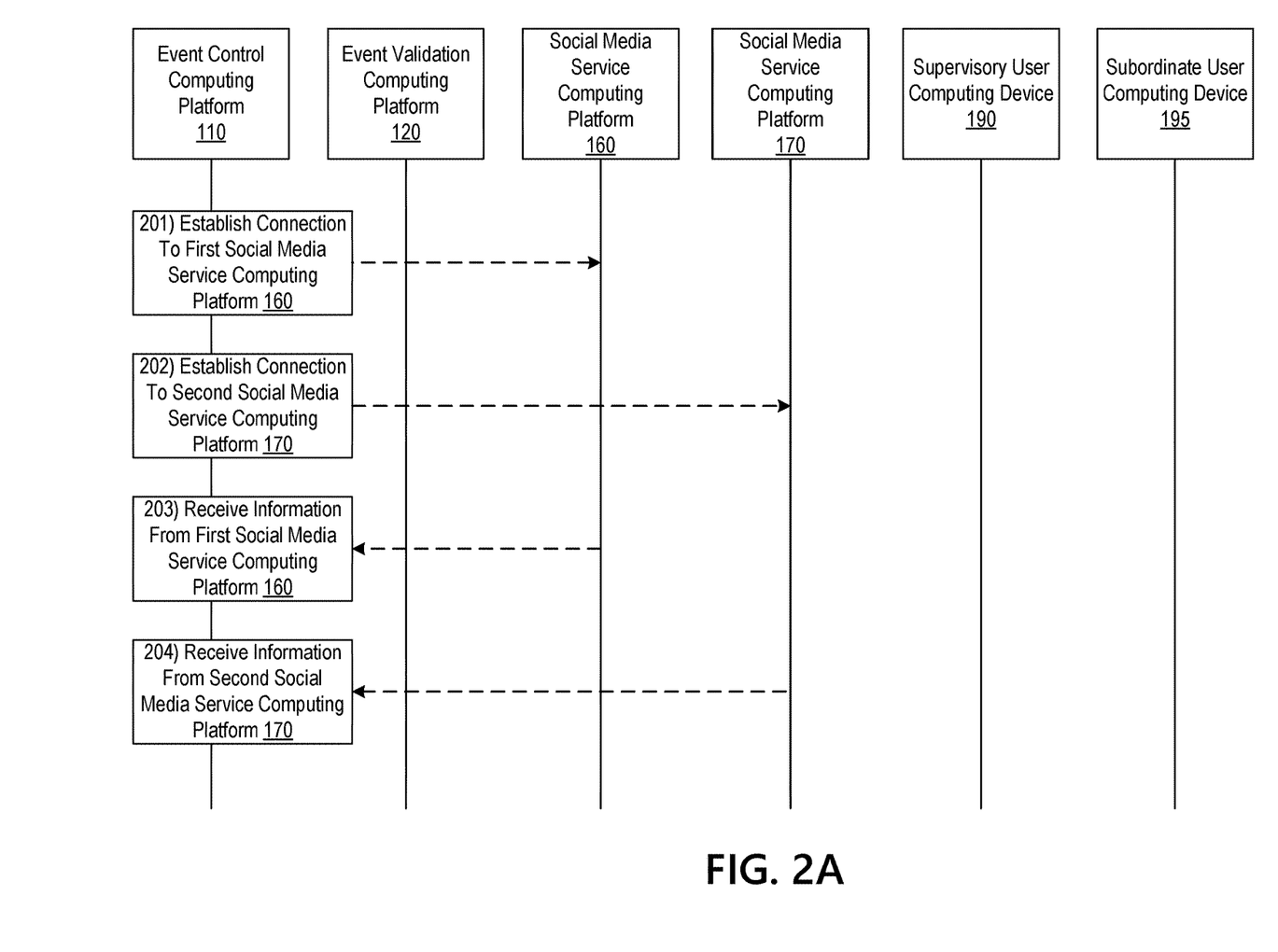
FIGS. 2A-2D depict an illustrative event sequence for multicomputer processing of user data with centralized event control in accordance with one or more example embodiments.

FIGS. 2A-2D depict an illustrative event sequence for multicomputer processing of user data with centralized event control in accordance with one or more example embodiments. Referring to FIG. 2A, at step 201, event control computing platform 110 may establish, via communication interface 113, a first connection to a first social media service computing platform 160 and in step 202, event control computing platform 110 may establish, via communication interface 113, a second connection to a second social media service computing platform 170. In general, event control computing platform 110 may establish connections to any number of social media service computing platforms. In some aspects, a data feed aggregation server 180 may aggregate all of the information from social media service computing platforms 160, 170 and other sources prior to processing that information. In one example, event control computing platform 110 may be operated by a financial institution such as a bank.

Social media service computing platforms 160, 170 may provide one or more social media feeds with information related to one or more users. A user may register with social media service computing platforms 160, 170 and social media service computing platforms 160, 170 may generate a user account and associated user credentials for logging into the user account. When the user enters valid user credentials, social media service computing platforms 160, 170 may provide the user with access to one or more services hosted by social media service computing platforms 160, 170. For example, the services hosted by social media service computing platforms 160, 170 may enable the user to receive and transmit messages to other users, upload pictures, share content of interest, and provide location information to generate a personalized social media feed associated with the user. The services hosted by social media service computing platforms 160, 170 also may enable the user to control who has access to the information in his or her personalized social media feed. For example, the user may limit access to user devices associated with friends, close acquaintances, or family members. In some examples, the user may also allow access to user devices associated with users that do not have an account on social media service computing platforms 160, 170.

Event control computing platform 110 (and/or associated devices such as administrative computing device 130) may also have access to a given user's social media feed on social media service computing platforms 160, 170 through private network 140 and public network 150. This access may be provided by the user associated with a given user account or someone who supervises the user associated with the user account (e.g., parent, guardian, or the like). Thus, once event control computing platform 110 has established connections to social media service computing platforms 160, 170, event control computing platform 110 may receive social media information from the first social media service computing platform 160 in step 203 and from the second social media service computing platform 170 in step 204. In addition, event control computing platform 110 may also establish connections to supervisory and subordinate user computing devices 190, 195 and receive additional information from these devices. Further still, event control computing platform 110 may receive additional information (e.g., information about financial transactions made by a given user, or the like) from additional sources (e.g., financial accounts) accessible to platform 110. Event control computing platform 110 may be specially configured to include decryption capabilities to allow the information to be transmitted safely and securely.

In some aspects, event control computing platform 110 may receive information from social media service computing platforms 160, 170 in real time as data is posted to social media service computing platforms 160, 170. In one example, in receiving information in real time, the information may be received by platform 110 within two minutes of being posted to social media service computing platforms 160, 170.

Once event control computing platform 110 receives social media information from social media computing platforms 160, 170, platform 110 may identify, based on this information, whether a change should be made to user data associated with a user identifiable by the received information. In some aspects, the user identifiable by the received information may be a subordinate user. Thus, in step 205, event control computing platform 110 may identify, based on the information received in steps 203 and 204, whether a change should be made to user data associated with the subordinate user identifiable by the received information. In some aspects, only a part of the information received in steps 203 and 204 may pertain to a given subordinate user, as other information received in steps 203 and 204 may pertain to other subordinate users and/or supervisory users. Thus, platform 110 may process only a part of the received information to identify whether a change should be made to user data associated with a given subordinate user.

In other aspects, platform 110 may process information received from social media service computing platforms 160, 170 in view of additional information available to event control computing platform 110. In one example, platform 110 may have access to financial records associated with the relevant subordinate user and/or associated supervisory user. Thus, in this example, platform 110 may process social media information in view of this additional financial information to identify whether a change should be made to user data of a given subordinate user.

In one example, event control computing platform 110 may identify, based on the information received in steps 203 and 204, whether a financial limit associated with an account of a given subordinate user should be increased. Event control computing platform 110 may identify that the received information indicates that the subordinate user in question is in need of additional financial resources based on a message posted on a social media feed associated with the subordinate user's social media account or associated with a social media account of another known to be accompanying the subordinate user in question. Additionally or alternatively, event control computing platform 110 may determine that the received information includes a location of the subordinate user and that the location of the subordinate user indicates that the subordinate user is in need of financial resources. This information, in combination with financial records associated with the subordinate user in question, may allow platform 110 to further establish that the subordinate user is in need of financial resources.

For example, a subordinate user (e.g., a teenager) may be seeking a cab or a ride-share service ride to return home from a baseball game on a Friday night. The teenager may realize that he lacks the funds necessary to purchase a ride home and so may post a message on his social media account. The message may indicate that he is stranded at the sporting event and that his bank account is low on funds. Alternatively, he may post a picture of himself standing in front of the baseball stadium with a message that indicates he is in need of money for the ride home. Event control computing platform 110 may receive the message and/or picture to determine that the teenager is in need of financial resources. In particular, platform 110 may identify, based on the received information, that funds should be added to the teenager's account because he is stranded at the baseball stadium without a ride home.

In another example, a subordinate user may be travelling (e.g., overseas, to a summer camp, or the like) and his current line of credit may be insufficient to meet his needs or may be working improperly. Event control computing platform 110 may flag this situation after analyzing the information received from social media service computing platforms 160, 170. Platform 110 may then be used to transfer funds to the subordinate user in this situation, such as to a mobile wallet, to allow the subordinate user to retrieve the funds. In addition, platform 110 may be used to automatically pre-queue an automated teller machine (ATM) transaction so that the subordinate user can get cash. In each of these examples, platform 110 may allow one or both of the supervisory user and/or associated subordinate user to opt in to the service provided by platform 110 and provide funds to the subordinate user or other users in case of a detected emergency.

Figure 2B:
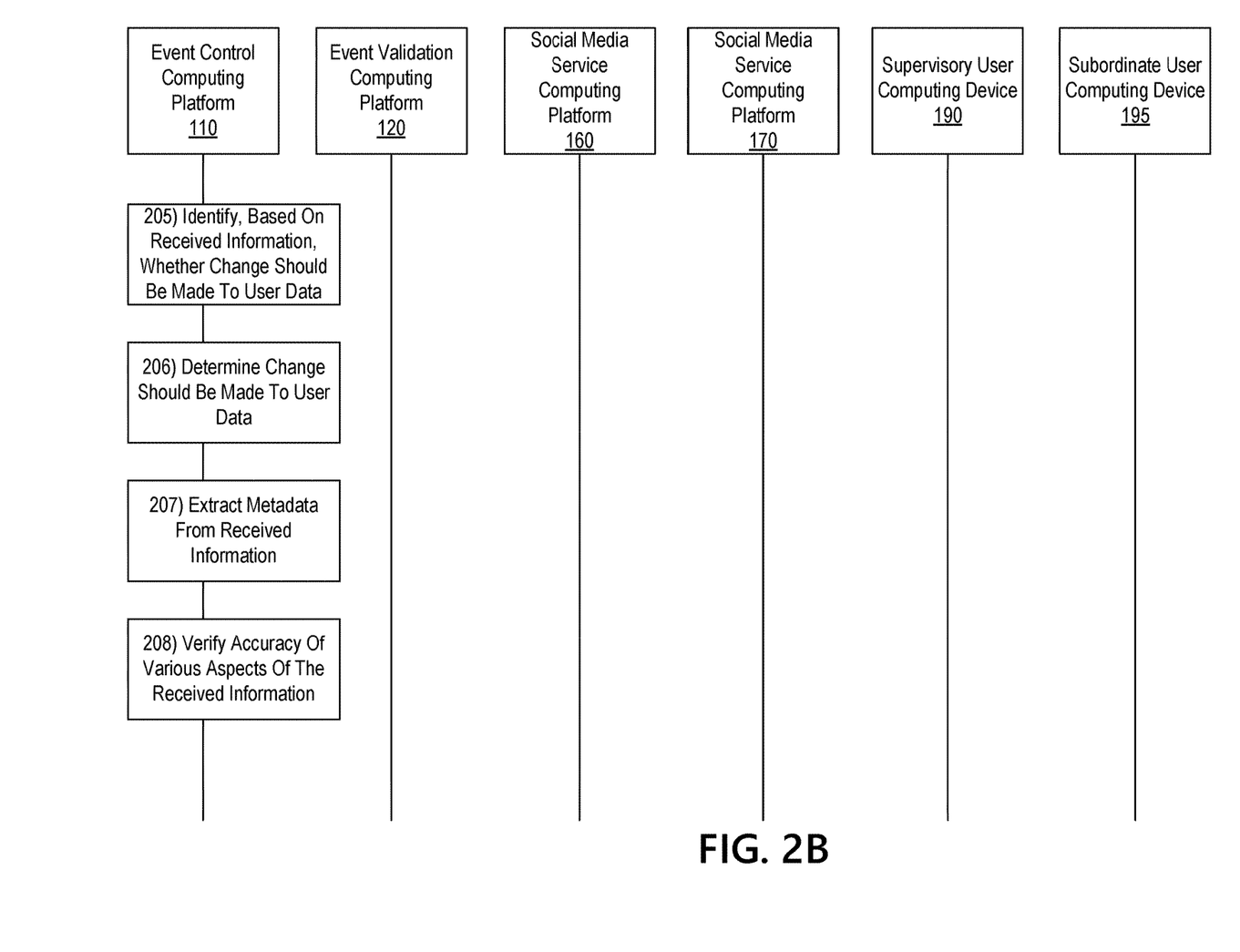

If the information received from social media service computing platforms 160, 170 does not indicate that a change should be made to user data associated with a given subordinate user, then the process may stop. In step 206, however, event control computing platform 110 may determine that the information received from social media service computing platforms 160, 170 indicates that a change should be made to user data associated with the subordinate user in question.

In one example, the change to the user data is a change to a financial limit of an account associated with the subordinate user in question. In this example, platform 110 may identify, based on the received information from social media service computing platforms 160, 170 along with other information (e.g., financial records), whether there is a realistic chance of an event that poses some danger to the subordinate user in question, such as unavailability of funds when the situation necessitates those funds (e.g., being stranded with no money for a cab, needing to buy groceries, stuck at a remote location and in need of gas, or the like). In addition, event control computing platform 110 may identify, based on the received information, whether a predetermined threshold for the funds available to the subordinate user or other user is in danger of being crossed.

Once the determination is made that a change should be made to user data, event control computing platform 110, in step 207, may extract metadata from the received information to verify the accuracy of at least one aspect of the information in step 207. Metadata associated with the received information may include any data about the received information, including data related to a date and time of a social media posting, a location at which a posted image was taken, a device with which the posted image was taken, a location of a given subordinate user when posting to his social media account, an identity of a user account to which a social media posting was made, and a location from which the user who posted a social media message logged into his user account, among other things.

Once metadata related to the received information has been extracted, event control computing platform 110 may determine that the metadata verifies the accuracy of various aspects of the received information in step 208. For example, platform 110 may verify a location of a subordinate user based on social media information from social media service computing platforms 160, 170. Such an identification may be based on various types of information, including a photo tagged with geolocation data and taken by the subordinate user in question or by another individual known to be accompanying the subordinate user in question. Platform 110 may use metadata associated with the photo to verify where the photo was taken, thus providing one additional indicator of the location of the subordinate user in question.

In addition, platform 110 may further verify the location of the user from an identification of landmarks within a photo posted by the user in question or someone known to be accompanying the user in question. In this aspect, event control computing platform 110 may include image processing capabilities to extract and identify known landmarks from received image data. Further still, a user may directly identify his location via a message posted to his social media feed, or someone known to be accompanying the user in question may have posted a message that identifies the location of the user. Computing platform 110 may then extract metadata associated with a related photo to corroborate or cast doubt on the stated location of the user in question. If the metadata associated with the received information casts doubt on the stated location of the user in question, then event control computing platform 110 may take other steps, including attempting to verify the location of a given subordinate user by contacting an associated supervisory user.

Similarly, platform 110 may also verify or discredit other information from social media service computing platforms 160, 170. For example, platform 110 may use machine learning engine 112d to derive intelligence from patterns of user behavior to determine anticipated needs or to corroborate or disqualify proposed needs of users. For example, if a subordinate user posts on his social media site that he missed the bus or is broke, platform 110 may use the time and date of the post, geolocation information extracted from the post, related account balance information of the subordinate user in question, and/or any transaction information related to the subordinate user to distinguish between a real need and a false positive.

In some examples, once event control computing platform 110 has verified the accuracy of the relevant portions of the received information, event control computing platform 110 may then transmit, in step 209, a request for authorizing a change to user data associated with a subordinate user to a supervisory user computing device 190 of a supervisory user associated with the subordinate user in question. In one example, the supervisory user may be a parent or guardian of a subordinate user (e.g., a teen) and the change to the user data may include an increase to a financial limit of an account used by the teen. The supervisory user may choose to authorize or reject the change to the teen's account based on the supervisory user's knowledge of the teen's need. If the supervisory user decides to reject authorization of the change to the user data, then the process may stop and event control computing platform 110 may not make any changes to the user data associated with the relevant subordinate user.

In one example, event control computing platform 110 may also calculate the amount of funds that should be transferred to the subordinate user's account. This calculation may be based on a variety of factors and if the situation relates to the subordinate user being stranded without the necessary funds for a ride home, these factors may include how far the subordinate user is away from home, fuel charges associated with the location where the subordinate user is located, historical rates for obtaining a cab or a ride-share service ride home from the location where the subordinate user is located.

Figure 3:
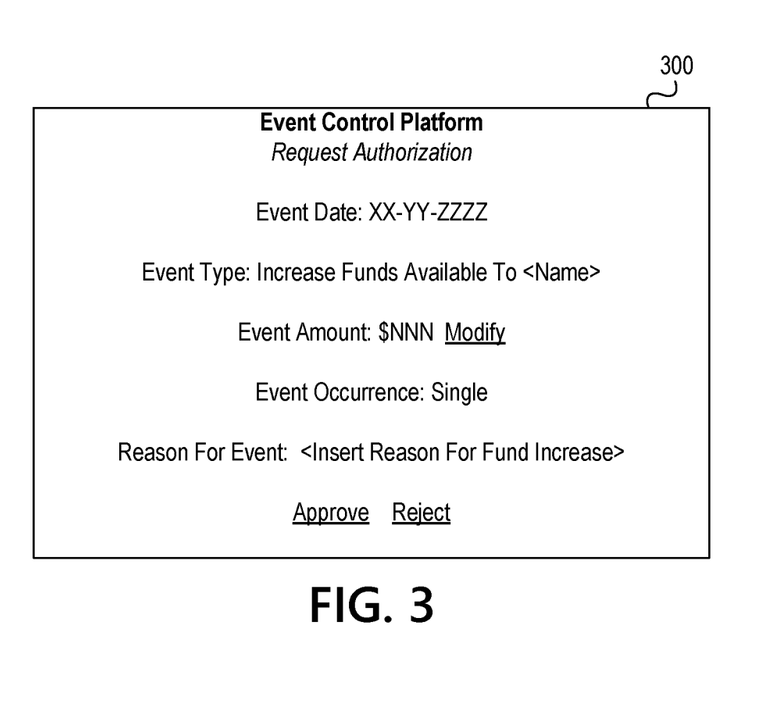
FIG. 3 depicts an example graphical user interface to obtain authorization for making a change to user data associated with a subordinate user in accordance with one or more example embodiments.

To obtain authorization for making a change to user data associated with a subordinate user, event control computing platform 110 may cause supervisory user computing device 190 to display and/or otherwise present a graphical user interface similar to graphical user interface 300, which is illustrated in FIG. 3. As shown in FIG. 3, graphical user interface 300 may include information related to the change in user data. For example, interface 300 may include the proposed date of the change to the user data and the type of change being requested. In the example shown in FIG. 3, event control computing platform 110 is requesting an increase in the amount of funds available to a given subordinate user associated with the supervisory user to which the request has been sent (e.g., via a parent-child relationship). Further, graphical user interface 300 may indicate the amount of funds to be added to the subordinate user's account and may further indicate that the proposed increase in funds available to the subordinate user is a single, non-repeating occurrence. In the example shown in FIG. 3, the supervisory user may modify the proposed increase to the amount of funds to which the subordinate user has access and/or may approve or reject the proposed change. Interface 300 may also include the reason that the increase in funds is being requested. In this example, event control computing platform 110 may monitor a subordinate user's banking and social media activity and filter/combine large volumes of information to produce information that is timely, relevant, financially actionable, and specific to an individual. Moreover, platform 110 may determine the context to prevent automated action taken against false positives or bad information.

Figure 2C:
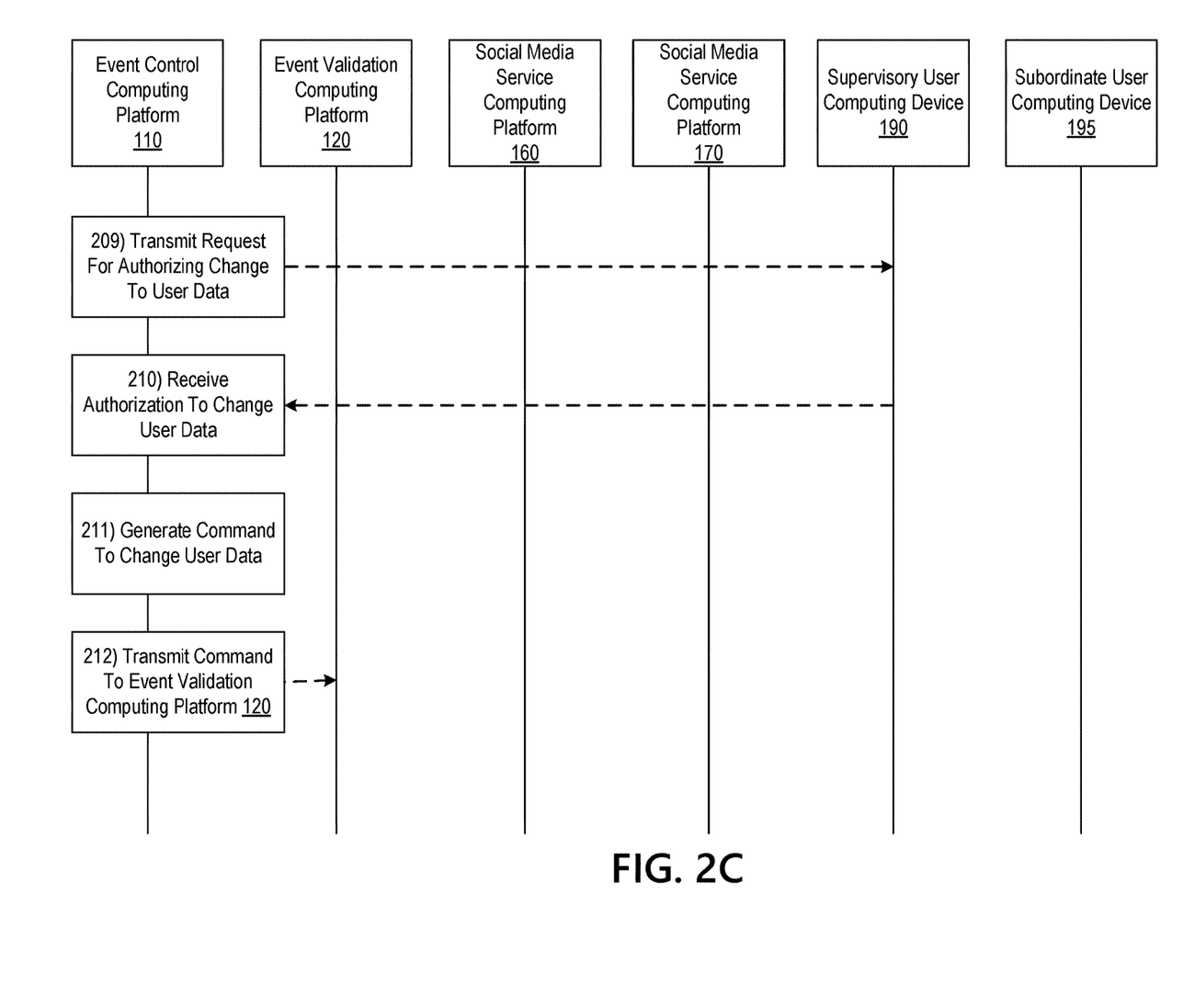

In step 210, supervisory user computing device 190 associated with a supervisory user may authorize a change to user data associated with a related subordinate user. In some examples, the supervisory user may use supervisory user computing device 190 to send a text message, email, voicemail, or any other type of message to event control computing platform 110 to indicate whether he authorizes the change to the user data of the subordinate user. In other examples, event control computing platform 110 may not need to transmit the request for authorization in step 209 because the supervisory user may have already provided authorization or may have instructed event control computing platform 110 that prior authorization is not necessary.

Next, in step 211, event control computing platform 110 may generate a command to change the user data associated with the relevant subordinate user. In one example, the change in the user data may be related to an increase in a financial limit of an account used by the subordinate user so that the subordinate user has access to more funds. In this example, event control computing platform 110 may transfer money into the subordinate user's account to help him get out of a difficult situation without intervention by the associated supervisory users (e.g., without having the associated supervisory users transfer money into the subordinate user's account themselves). In this regard, platform 110 may act as a local custodian (e.g., a real-time financial advisor) within predetermined boundaries set by the supervisory user to help the associated subordinate user when the need arises.

Figure 2D:
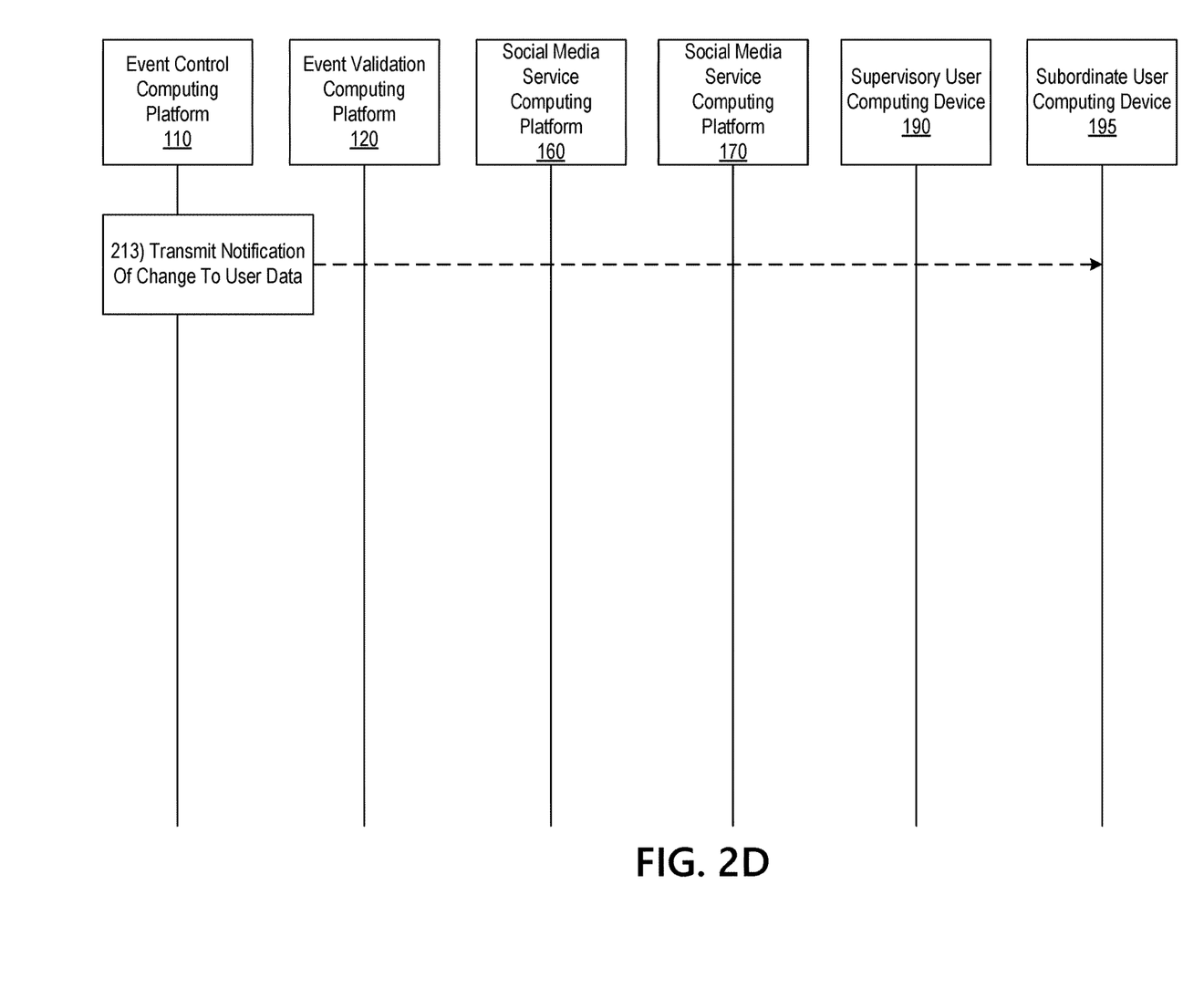

Once a command has been generated, event control computing platform 110 may then transmit the command to event validation computing platform 120 in step 212. Event validation computing platform 120 may then process the command to change the user data in the way specified by the received command. Finally, in step 213, event control computing platform 110 may then transmit a notification of the change to the user data to subordinate user computing device 195.

In one example, event validation computing platform 120 may transfer funds from a financial account of a supervisory user to a financial account of an associated subordinate user once platform 120 receives the command to change user data associated with the relevant subordinate user.

In some aspects, event control computing platform 110 may reprogram functionality of platform 110, using machine learning engine 112d, to alter a condition under which user data is changed. For example, platform 110 may change user data based on a distance that a user is away from his residence, based on a number of other individuals that are accompanying the user (e.g., friends, relatives), and/or based on the number of other individuals about which event control computing platform 110 receives information. In basing the change to a given subordinate user's user data on information about other individuals, event control computing platform 110 may identify, based on the received information, which subordinate users have characteristics similar (e.g., similar age, location, hobbies) to the subordinate user in question. Event control computing platform 110 may then base a decision to change user data on the received information associated with those subordinate users that are similar to the subordinate user in question.

Figure 4:
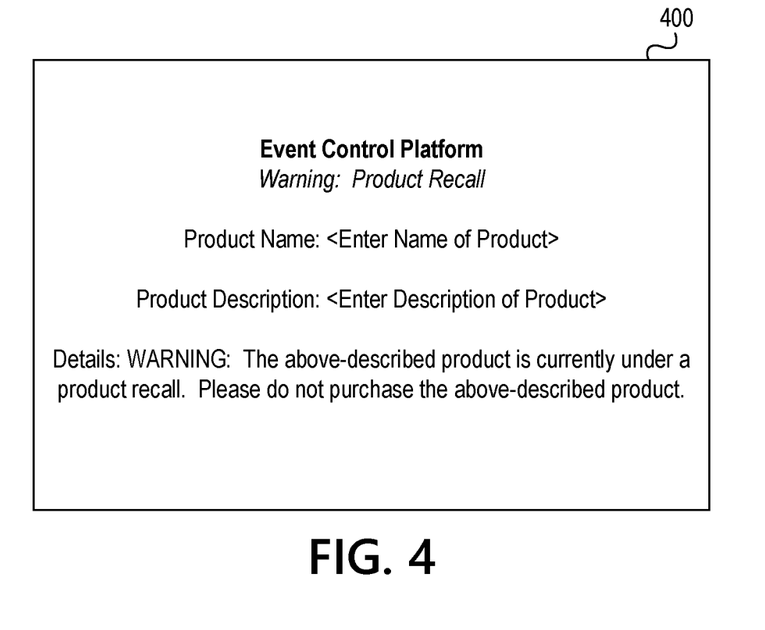
FIG. 4 depicts an example warning message transmitted from an event control computing platform indicating a product recall in accordance with one or more example embodiments.

In other examples, event control computing platform 110 may receive information from social media service computing platforms 160, 170 and transmit other types of messages to both supervisory and subordinate user computing devices 190, 195 based on the received information. For example, event control computing platform 110 may identify, based on information received from social media service computing platforms 160, 170 and other sources, that a particular product poses some sort of danger or is under a product recall (e.g., stock keeping unit (SKU)-level data). Platform 110 may determine the identity of the product in question and the merchants that sell that product. In this scenario, platform 110 may transmit a warning message to one or both of supervisory and subordinate user computing devices 190, 195 about the product in question. The warning message may indicate that that the product in question poses some sort of danger or is under a product recall, as shown in FIG. 4. Message 400 may include the name and a description of the product as well as a warning to let subordinate and supervisory users know that they should not purchase the product.

Because event control computing platform 110 may receive information from social media service computing platforms 160, 170 and other sources about many different individuals, platform 110 may be able to identify trends and draw inferences from those trends to be able to provide information to individuals based on those inferences. For example, if platform 110 identifies a correlation between individuals purchasing a product at a particular merchant and injuries to those individuals, then platform 110 may transmit a warning message to subordinate and supervisory users that may be at a risk for purchasing that product. For example, based on the received information, platform 110 may identify that many users are getting injured from using a popular bicycle or are getting sick from purchasing coffee at a popular restaurant. In this additional way, event control computing platform 110 may serve to protect individuals from potentially dangerous events.

Figure 5:
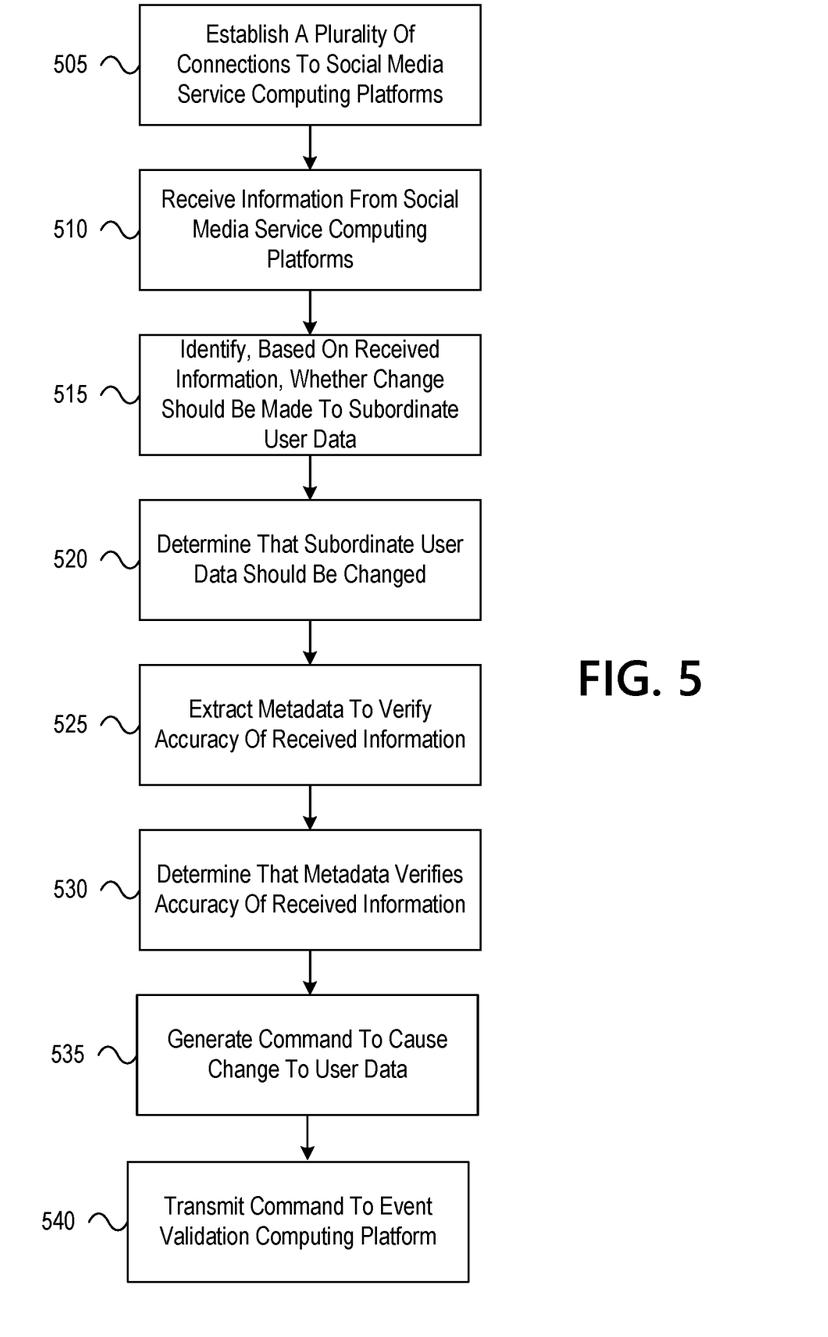
FIG. 5 depicts an illustrative method for multicomputer processing of user data with centralized event control in accordance with one or more example embodiments.

FIG. 5 depicts an illustrative method for multicomputer processing of user data with centralized event control in accordance with one or more example embodiments. Referring to FIG. 5, at step 505, a computing platform having at least one processor, a memory, and a communication interface may establish, via the communication interface, a plurality of connections to a plurality of social media service computing platforms. Subsequently, at step 510, the computing platform may receive first information from at least one of the plurality of social media service computing platforms. Then, at step 515, the computing platform may identify, using a machine learning engine, based on the first information, whether a change should be made to user data associated with a first subordinate user identifiable by the first information, and at step 520, the computing platform may determine that the first information indicates that a change should be made to the user data. At step 525, the computing platform may extract metadata from the first information to verify the accuracy of at least one aspect of the first information, and at step 530, the computing platform may then determine that the metadata verifies the accuracy of the at least one aspect of the first information. Next, in step 535, the computing platform may generate a command configured to cause the change to the user data. Finally, in step 540, the computing platform may transmit, via the communication interface, the command to an event validation computing platform.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform, comprising:
   at least one processor;
   a communication interface communicatively coupled to the at least one processor; and
   memory storing computer-readable instructions that, when executed by the at least one processor, cause the computing platform to:
      establish, via the communication interface, a plurality of connections to a plurality of social media service computing platforms;
      while the plurality of connections is established, receive first information from at least one of the plurality of social media service computing platforms, the first information including information associated with a first subordinate user, a second subordinate user, and a supervisory user;
      process a portion of the first information to identify the first subordinate user;
      identify, based on the first information, whether a change should be made to user data associated with the first subordinate user;
      determine, using machine learning and based on data from users that are similar to the first subordinate user, that the first information indicates that a change should be made to the user data;
      verify accuracy of at least one aspect of the first information;
      responsive to verifying the accuracy of at least one aspect of the first information:
         generate a command causing the change to the user data; and
         transmit, via the communication interface, the command to an event validation computing platform.

2. The computing platform of claim 1, wherein the memory stores additional computer-readable instructions that, when executed by the at least one processor, cause the computing platform to:
   transmit, via the communication interface, to a computing device associated with the first subordinate user, a first notification of the change to the user data.

3. The computing platform of claim 2, wherein the memory stores additional computer-readable instructions that, when executed by the at least one processor, cause the computing platform to:
   transmit, prior to sending the command causing the change to the user data, to a supervisory user computing device associated with a supervisory user, a request for authorizing the change to the user data.

4. The computing platform of claim 3, wherein the memory stores additional computer-readable instructions that, when executed by the at least one processor, cause the computing platform to:
   transmit, via the communication interface, to the supervisory user computing device associated with the supervisory user, a second notification of the change to the user data.

5. The computing platform of claim 3, wherein the memory stores additional computer-readable instructions that, when executed by the at least one processor, cause the computing platform to:
   reprogram functionality of the computing platform, using a machine learning engine, to alter a condition under which the user data is changed.

6. The computing platform of claim 5, wherein the memory stores additional computer-readable instructions that, when executed by the at least one processor, cause the computing platform to:
   reprogram functionality of the computing platform, using the machine learning engine, such that the condition under which the user data is changed is based on a distance that the first subordinate user is located away from a residence of the first subordinate user.

7. The computing platform of claim 5, wherein the memory stores additional computer-readable instructions that, when executed by the at least one processor, cause the computing platform to:
   reprogram functionality of the computing platform, using the machine learning engine, such that the condition under which the user data is changed is based on a number of other individuals with which the first subordinate user is travelling.

8. The computing platform of claim 5, wherein the memory stores additional computer-readable instructions that, when executed by the at least one processor, cause the computing platform to:
   reprogram functionality of the computing platform, using the machine learning engine, such that the condition under which the user data is changed is based on additional information received from the plurality of social media service computing platforms, wherein the additional information relates to a plurality of other subordinate users identifiable by the additional information.

9. The computing platform of claim 8, wherein the memory stores additional computer-readable instructions that, when executed by the at least one processor, cause the computing platform to:
reprogram functionality of the computing platform, using the machine learning engine, such that the condition under which the user data is changed is based on the additional information received about the plurality of other subordinate users that are similar to the first subordinate user.

10. The computing platform of claim 1, wherein verifying the accuracy of the at least one aspect of the first information comprises verifying the accuracy of a location of the first subordinate user.

11. The computing platform of claim 1, wherein the memory stores additional computer-readable instructions that, when executed by the at least one processor, cause the computing platform to:
determine that a warning message should be transmitted to the first subordinate user regarding a future event.

12. The computing platform of claim 1, wherein the memory stores additional computer-readable instructions that, when executed by the at least one processor, cause the computing platform to:
determine if a threshold associated with the user data will be exceeded; and
transmit, via the communication interface, the command to the event validation computing platform if the threshold will be exceeded.

13. A method, comprising:
at a computing platform comprising at least one processor, memory, and a communication interface:
establishing, via the communication interface, a plurality of connections to a plurality of social media service computing platforms;
while the plurality of connections is established, receiving first information from at least one of the plurality of social media service computing platforms, the first information including information associated with a first subordinate user, a second subordinate user, and a supervisory user;
processing a portion of the first information to identify the first subordinate user;
identifying, based on the first information, whether a change should be made to user data associated with the first subordinate user;
determining, using machine learning and based on data from users that are similar to the first subordinate user, that the first information indicates that a change should be made to the user data;
verify accuracy of at least one aspect of the first information;
if the accuracy of the at least one aspect of the first information is verified:
generating a command causing the change to the user data; and
transmitting, via the communication interface, the command to an event validation computing platform.

14. The method of claim 13, further comprising: transmitting, prior to sending the command causing the change to the user data, to a supervisory user computing device associated with a supervisory user, a request for authorizing the change to the user data.

15. The method of claim 13, further comprising: reprogramming functionality of the computing platform, using a machine learning engine, to alter a condition under which the user data is changed.

16. The method of claim 13, wherein the verifying the accuracy of the at least one aspect of the first information comprises verifying the accuracy of a location of the first subordinate user.

17. The method of claim 13, further comprising: determining that a warning message should be transmitted to the first subordinate user regarding a future event.

18. The method of claim 13, further comprising:
determining if a threshold associated with the user data will be exceeded; and
transmitting, via the communication interface, the command to the event validation computing platform if the threshold will be exceeded.

19. The method of claim 13, wherein the receiving the first information from the at least one of the plurality of social media service computing platforms comprises receiving the first information from the at least one of the plurality of social media service computing platforms in real time.

20. One or more non-transitory computer-readable media storing instructions that, when executed by a computing platform comprising at least one processor, memory, and a communication interface, cause the computing platform to:
establish, via the communication interface, a plurality of connections to a plurality of social media service computing platforms;
while the plurality of connections is established, receive first information from at least one of the plurality of social media service computing platforms, the first information including information associated with a first subordinate user, a second subordinate user, and a supervisory user;
process a portion of the first information to identify the first subordinate user;
identify, based on the first information, whether a change should be made to user data associated with the first subordinate user;
determine, using machine learning and based on data from users that are similar to the first subordinate user, that the first information indicates that a change should be made to the user data;
verify accuracy of at least one aspect of the first information;
responsive to verifying the accuracy of the at least one aspect of the first information:
generate a command causing the change to the user data; and
transmit, via the communication interface, the command to an event validation computing platform.

* * * * *